(12) United States Patent
Mayer et al.

(10) Patent No.: US 11,973,652 B2
(45) Date of Patent: Apr. 30, 2024

(54) FIELD DETECTION DEVICE FOR A FIELDBUS NETWORK

(71) Applicant: Endress+Hauser Process Solutions AG, Reinach (CH)

(72) Inventors: Michael Mayer, Oberwil (CH); Werner Luber, Allschwil (CH); Stefan Müller Osolin, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 489 days.

(21) Appl. No.: 17/286,553

(22) PCT Filed: Nov. 21, 2019

(86) PCT No.: PCT/EP2019/082051
§ 371 (c)(1),
(2) Date: Apr. 19, 2021

(87) PCT Pub. No.: WO2020/126288
PCT Pub. Date: Jun. 25, 2020

(65) Prior Publication Data
US 2021/0344566 A1 Nov. 4, 2021

(30) Foreign Application Priority Data
Dec. 21, 2018 (DE) ...................... 10 2018 133 465.6

(51) Int. Cl.
*H04L 12/28* (2006.01)
*G06F 16/245* (2019.01)
(Continued)

(52) U.S. Cl.
CPC ............ *H04L 41/12* (2013.01); *G06F 16/245* (2019.01); *H04W 48/20* (2013.01)

(58) Field of Classification Search
CPC ..... H04L 41/12; H04L 51/046; G06F 16/245; H04W 48/20; Y02P 90/02; G05B 19/0428; G05B 2219/25428; G05B 2219/31121
(Continued)

(56) References Cited

U.S. PATENT DOCUMENTS

2005/0066014 A1* 3/2005 Willehadson ........... G06F 9/505
709/220
2006/0282580 A1* 12/2006 Russell, III ........... G06F 13/387
710/62
(Continued)

FOREIGN PATENT DOCUMENTS

CN 104155949 A 11/2014
CN 107683588 A 2/2018
(Continued)

*Primary Examiner* — Chuong T Ho
(74) *Attorney, Agent, or Firm* — Mark A. Logan; Endress+Hauser (USA) Holding, Inc.

(57) ABSTRACT

Disclosed is a field detection device designed to be connected to at least one access point of a fieldbus network via at least one interface. The field detection device is designed to initiate or execute, for each of at least two connection protocols, an associated query in at least one fieldbus segment of the fieldbus network and to detect which field devices and fieldbus components in said at least one fieldbus segment can be accessed via the connection protocol in question. Furthermore, the field detection device is designed to provide a connection directory in which at least one connection protocol is specified for each field device and for each fieldbus component of a set of field devices and fieldbus components of the at least one fieldbus segment, by means of which connection protocol the field device in question or the fieldbus component in question can be accessed.

13 Claims, 4 Drawing Sheets

| IP address | TAG | Device type | Profinet | HART-IP | OPC UA | Web server |
|---|---|---|---|---|---|---|
| 192.168.000.001 | Tank_1 | Flow | X | | | |
| 192.168.000.012 | Tank_7 | Flow | X | | X | |
| 192.168.000.142 | Tank_12 | Fill level | | X | | X |

17

(51) Int. Cl.
*H04L 41/12* (2022.01)
*H04W 48/20* (2009.01)

(58) Field of Classification Search
USPC .......................................... 370/254
See application file for complete search history.

(56) References Cited

U.S. PATENT DOCUMENTS

| | | |
|---|---|---|
| 2009/0049207 A1 | 2/2009 | Reynolds et al. |
| 2010/0131582 A1 | 5/2010 | Driscoll et al. |
| 2011/0264244 A1* | 10/2011 | Pettigrew .............. H04L 12/403 |
| | | 700/89 |
| 2013/0203359 A1* | 8/2013 | Seiler ................. G05B 19/0428 |
| | | 455/67.11 |
| 2016/0217242 A1* | 7/2016 | Beaubien ................ G06F 30/34 |

FOREIGN PATENT DOCUMENTS

| | | |
|---|---|---|
| DE | 102010029952 A1 | 12/2011 |
| DE | 102013204535 A1 | 10/2013 |
| DE | 102016000234 A1 | 7/2016 |
| DE | 102015108053 A1 | 11/2016 |
| DE | 102016120972 A1 | 5/2018 |
| DE | 102017103553 A1 | 8/2018 |
| DE | 102017109030 A1 | 10/2018 |
| GB | 2535839 A | 8/2016 |

* cited by examiner

| IP address | TAG | Device type | Profinet | HART-IP | OPC UA | Web server |
|---|---|---|---|---|---|---|
| 192.168.000.001 | Tank_1 | Flow | x | | | |
| 192.168.000.012 | Tank_7 | Flow | x | | x | |
| 192.168.000.142 | Tank_12 | Fill level | | x | | x |

FIELD DETECTION DEVICE FOR A FIELDBUS NETWORK

CROSS-REFERENCE TO RELATED APPLICATIONS

The present application is related to and claims the priority benefit of German Patent Application No. 10 2018 133 465.6, filed on Dec. 21, 2018 and International Patent Application No. PCT/EP2019/082051, filed on Nov. 21, 2019, the entire contents of which are incorporated herein by reference.

TECHNICAL FIELD

The invention relates to a field detection device and a fieldbus network comprising at least one field detection device. The invention also relates to a method for creating a connection directory for a fieldbus network and to a method for establishing a data connection between a field operating device and a field device or a fieldbus component in a fieldbus network.

BACKGROUND

Multiple field devices serving to detect and/or influence process variables are used in automation technology. Examples of field devices of this type are fill-level measurement devices, mass flow meters, pressure and temperature measurement devices, etc., which, as sensors, record the corresponding process variables, fill level, flow rate, pressure, and temperature.

In fieldbus systems in process automation technology, the field devices and fieldbus components are frequently accessed via mobile field operating devices, for example via tablets, mobile telephones or laptops. Such accesses are carried out, for example, in order to read out and change parameters of the field devices and fieldbus components. In order to be able to establish a connection from the field operating device to the field device in question or the fieldbus component in question, such field operating devices in many cases initiate device scans within individual fieldbus segments in order to query the connection possibilities for the field device in question or the fieldbus component in question. However, such queries and scans are an additional burden for the fieldbus network.

SUMMARY

The object of the invention is to simplify access from a field operating device to a field device or a fieldbus component of a fieldbus network and to provide the field operating device with the information required for this purpose.

Advantageous developments of the invention are specified in the dependent claims.

A field detection device according to embodiments of the present invention is designed to be connected to at least one access point of a fieldbus network via at least one interface. In addition, the field detection device is designed to initiate or execute, for each of at least two connection protocols, an associated query in at least one fieldbus segment of the fieldbus network and to detect which field devices and fieldbus components in said at least one fieldbus segment can be accessed by means of the connection protocol in question. Furthermore, the field detection device is designed to provide a connection directory in which at least one connection protocol is specified for each field device and for each fieldbus component of a set of field devices and fieldbus components of the at least one fieldbus segment, by means of which connection protocol the field device in question or the fieldbus component in question can be accessed.

The use of such a field detection device has the advantage that a centrally managed connection directory is maintained by the field detection device and contains all connection information required for access to the field devices and fieldbus components of the fieldbus network. A field operating device which would like to access parameters of a field device or a fieldbus component can use the connection directory to select a suitable connection possibility for the field device in question. In particular, information is available to the field operating device as to which connection protocols the field device in question or the fieldbus component in question supports. As a result, it is no longer necessary for the field operating device itself to initiate a scan of the fieldbus network.

In the solution according to the invention, the queries and scans are initiated or executed by the field detection device, whereas the field operating devices can access the centrally maintained and updated connection directory. Burdening the network with the scan requests of a multiplicity of mobile devices can thus be prevented. An additional advantage is that the software required for executing the scans can be omitted from the field operating devices.

A further advantage is that the field operating device is presented with the largest possible number of access possibilities, so that the most suitable connection possibility can be determined. A certain redundancy is made possible because one and the same field device can be accessed in different ways. If, for example, a fault occurs on one of the possible connections, a different connection possibility can be used.

A method according to the embodiments of the invention serves to create a connection directory for a fieldbus network. The method comprises, for at least two connection protocols, in each case initiating or executing an associated query in at least one fieldbus segment of the fieldbus network and detecting which field devices and fieldbus components in the at least one fieldbus segment can be accessed by means of the connection protocol in question. Furthermore, the method comprises the provision of a connection directory in which at least one connection protocol is specified in each case for each field device and for each fieldbus component of a set of field devices and fieldbus components of the at least one fieldbus segment, by means of which connection protocol the field device in question or the fieldbus component in question can be accessed.

Another method according to the embodiments of the invention is used for establishing a data connection between a field operating device and a field device or fieldbus component in a fieldbus network. The fieldbus network here comprises a field detection device which is designed to provide a connection directory in which at least one connection protocol is specified for each field device and for each fieldbus component of a set of field devices and fieldbus components of the fieldbus network, by means of which connection protocol the field device in question or the fieldbus component in question can be accessed. The method includes retrieval of the connection directory, or at least portions of the connection directory provided by the field detection device via the field operating device. The method comprises the field operating device selecting a connection protocol for the access to a field device or a fieldbus component. Furthermore, the method comprises the field operating device accessing the field device in question or the fieldbus component in question using the selected connection protocol.

In a field device or a fieldbus component according to an embodiment of the invention, a QR code or another optically readable code is applied to the field device or to the fieldbus component. The QR code or other optically readable code specifies at least one suitable connection protocol by means of which the field device or the fieldbus component can be accessed.

At least one access path via which a field operating device can access the field device or the fieldbus component and a connection protocol supported by this field device or by the fieldbus component, is preferably specified in the QR code or the other optically readable code for the field device or for the fieldbus component.

At least one access point via which a connection to the field device or the fieldbus component can be established and a connection protocol supported by this field device or by the fieldbus component is preferably specified in the QR code or the other optically readable code for the field device or for the fieldbus component.

A method according to the embodiments of the present invention is used for establishing a connection between a field operating device and a particular field device or fieldbus component of a fieldbus network. A QR code or another optically readable code is applied to the field device or to the fieldbus component and specifies at least one suitable connection protocol by means of which the field device or the fieldbus component can be accessed. The method comprises reading and evaluating the QR code or other optically readable code by means of a camera of the field operating device and accessing the field device using one of the connection protocols specified in the QR code or the other optically readable code.

BRIEF DESCRIPTION OF THE DRAWINGS

In the following, the invention is outlined in more detail with the aid of exemplary embodiments depicted in the drawings. The figures show.

DETAILED DESCRIPTION

Figure 1:
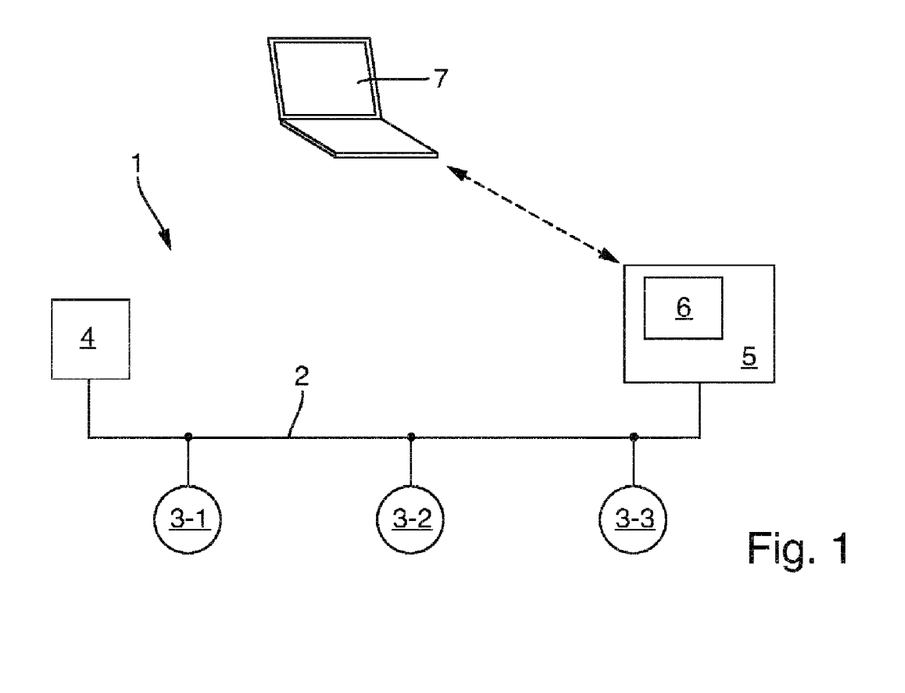
FIG. 1 shows a fieldbus network with a field detection device.

FIG. 1 shows a fieldbus network 1 with a field bus 2 to which a plurality of field devices 3-1, 3-2, 3-3 are connected. Furthermore, a field access device 4 via which the individual field devices 3-1, 3-2, 3-3 can be accessed is connected to the field bus 2. In this way, it is possible, for example, to configure a field device, read out or reset parameters of the field device, for example to configure them, to read out parameters, etc. In addition, in the fieldbus network 1 shown in FIG. 1, a field detection device 5 is connected to the field bus 2. The field detection device 5 is designed to detect which different possibilities there are for access to the field devices 3-1, 3-2, 3-3. The field detection device 5 is designed in particular to determine which connection protocols are supported by the individual field devices 3-1, 3-2, 3-3. In addition, the field detection device 5 can be used for example to detect the access paths within the fieldbus network 1 via which an access to the various field devices 3-1, 3-2, 3-3 is effected. For example, access to the various field devices 3-1, 3-2, 3-3 can take place via a wireless connection, for example via a mobile radio connection or a WLAN connection, or via a wire-based connection. The information relating to the different access possibilities is compiled and stored by the field detection device 5 in a connection directory 6. The field detection device 5 can be a standalone device. Alternatively, the field detection device 5 can also be designed as part of another network component, for example an EDGE device.

The connection protocols supported by the field devices and the possible access paths and access points are preferably specified in the connection directory 6 for the field devices 3-1, 3-2, 3-3. The connection directory 6 thus serves as a "connection dictionary". All the information required for access to the various field devices 3-1, 3-2, 3-3 is in particular made available via the connection directory 6 provided by the field detection device 5. The field detection device 5 is designed to update the connection directory 6 according to a prespecifiable time scheme, preferably at fixed time intervals, and to update the connection information in the connection directory 6.

The user needs to access a specific field device of the fieldbus network 1 within a production plant from a mobile field operating device 7, for example from a tablet, in order to check individual parameters of the field device, for example. In order to effect such an access to a field device, the field operating device 7 first retrieves the connection directory 6 from the field detection device 5. Access to a specific field device, for example to field device 3-2, can then be carried out according to an access possibility listed in connection directory 6 for field device 3-2 using a suitable connection protocol.

In this case, the field detection device 5 is only designed to provide the required connection information to the field operating device 7. The field detection device 5 itself is not designed to serve as an access node for the fieldbus network 1 and establish a connection to one of the field devices 3-1, 3-2, 3-3. Instead, the field operating device 7 can establish the connection to the field device in question by means of the provided connection information via an access node of the fieldbus network 1 that is provided for this purpose. In the example shown in FIG. 1, the field operating device 7 can, for example, access the fieldbus network 1 via the field access device 4.

Especially in the field of Ethernet-based connection protocols and Industrial Ethernet protocols, field devices and fieldbus components frequently support a plurality of different connection protocols. Field devices and fieldbus components designed to be accessed by means of one of these Ethernet-based protocols often also support one or two other Ethernet-based connection protocols, so that there are consequently different possibilities of accessing these field devices and fieldbus components. In many cases it is possible to access a field device via one and the same connection line by means of different Ethernet-based connection protocols.

Possible connection protocols are, for example, Profinet, TCP UA, OPC UA, CDI_TCP, EtherNet/IP, HART-IP. In addition, a multiplicity of devices can also be accessed by means of the HTTP connection protocol.

The field detection device 5 is designed to query, for a plurality of different connection protocols, which field devices and fieldbus components support the connection protocol in question. One possibility for executing such a query is to initiate a scan within the fieldbus network or within individual fieldbus segments of the fieldbus network in order to determine in this way those field devices and fieldbus components which support the connection protocol in question. A prerequisite for this is that the connection protocol in question supports such scan or discovery commands. If this is the case, the field detection device 5 can transmit the scan command for the connection protocol in question for the fieldbus network or for at least one fieldbus segment which thereupon checks the field devices and fieldbus components within the fieldbus network or within at least one fieldbus segment and determines which field devices and fieldbus components support the connection protocol in question. A fieldbus segment is to be understood here as meaning a region of a fieldbus network, preferably a region delimited with respect to the network infrastructure.

However, there are also connection protocols such as HTTP for which there is no such scan or discovery command. In order to be able to find out also in such a case which of the field devices and fieldbus components of the fieldbus network 1 support the connection protocol in question, it can be provided as a second possibility that the field detection device 5 attempts to establish connections for the individual field devices and fieldbus components of the fieldbus network 1. Frequently, the ports of the field devices and fieldbus components via which a connection can be established are known in advance. For example, the establishment of connection for HTTP is via port 80. In this respect, the field detection device 5 can determine which field devices and fieldbus components support this connection protocol by the establishment of test connections for a specific connection protocol on a trial basis.

Based on the results of these queries, the field detection device 5 provides a connection directory 6 in which all connection possibilities for the field devices and fieldbus components of the fieldbus network are listed. In this case, the individual connection possibilities within the connection directory 6 are preferably correspondingly sorted by the individual field devices and fieldbus components, so that it is immediately recognizable which connection possibilities exist for a specific device. For example, the connection possibilities can be arranged according to the IP addresses of the devices, according to the MAC addresses of the devices or according to the device tags or station names of the devices in the connection directory 6. The information relating to a specific connection possibility for a specific device in this case primarily comprises the connection protocol by means of which the device can be accessed. In addition, however, information about the access paths and the access points to be used within the fieldbus network can also be provided. In addition, additional information regarding the field devices and fieldbus components such as, for example, device type, device manufacturer, tag, IP address, MAC address, as well as further details determined in the queries executed by the field detection device 5 can be stored within the connection directory 6.

The field detection device 5 is designed to update the connection directory 6 in accordance with a prespecified time scheme, preferably at fixed time intervals, and to update the connection information in the connection directory 6. The queries and scans required for this purpose are repeatedly executed by the field detection device 5 in accordance with a prespecified time scheme.

In the following, some specific connection protocols are to be discussed without any claim to be a complete listing thereof.

The Profinet connection protocol is an example of an Industrial Ethernet protocol in which commands and data are transmitted in the form of Ethernet packets. The Profinet protocol comprises a scan command for querying field devices and fieldbus components which support the Profinet protocol.

The CDI_TCP connection protocol is a proprietary Industrial Ethernet protocol from Endress+Hauser.

The OPC Unified Architecture, or OPC UA for short, standard provided by the OPC Foundation comprises, on the one hand, methods for data modeling which enable the creation of information models on the basis of object-relational constructs. In addition, the OPC UA and TCP UA standards serve as connection protocols, which in particular offer authentication, certification, access control in addition to the actual communication protocol. Within the OPC UA connection standard a discovery service is defined which makes it possible to identify those field devices and fieldbus components which support the OPC UA standard.

EtherNet/IP is another common Ethernet-based field bus based on an open industry standard.

In EtherNet/IP, a scan command is also defined to determine the field devices and fieldbus components supporting the standard. For the connection of HART components in particular, there are the HART-IP and wireless HART standards. These standards are also Ethernet-based protocols in which the HART raw data are transmitted in the form of Ethernet packets. HART IP and wireless HART also support a scanning functionality.

In addition, many field devices and fieldbus components each provide their own internet site or an internet service, via which access to parameters of the field device in question or the fieldbus component in question is possible. In this solution, device parameters can be read out or modified by means of the HTTP connection protocol, for example. In order to generate the internet site or the internet service, the field device in question or the fieldbus component in question can each comprise its own internet server. In the HTTP (Hypertext Transfer Protocol) connection protocol, it is not possible to query by means of a scanning command whether or not the field devices in question and fieldbus components in question support internet server functionality. In this respect, it is only possible with this solution to attempt to establish test connections based on HTTP from the field detection device 5 to the individual field devices and fieldbus components via the port 80 reserved for this purpose. The establishment of such test connections from the field detection device 5 on a trial basis makes it possible to determine which of the field devices and fieldbus components of the fieldbus network can be accessed by means of the HTTP connection protocol.

In addition, it is also possible to equip the field detection device 5 itself with an internet server functionality. Via the internet server function of the field detection device 5, an internet site dedicated thereto can be provided which provides a plurality of links to the internet sites and internet services of the field devices and fieldbus components of the network system. In this respect, it is possible to access the field devices and fieldbus components listed in this overview via this internet site service of the field detection device 5 by means of the HTTP connection protocol and to read out or reset parameters by means of the HTTP protocol. Only the knowledge of the IP address of the internet site provided by the field detection device 5 is then required for the device access.

Figure 2:
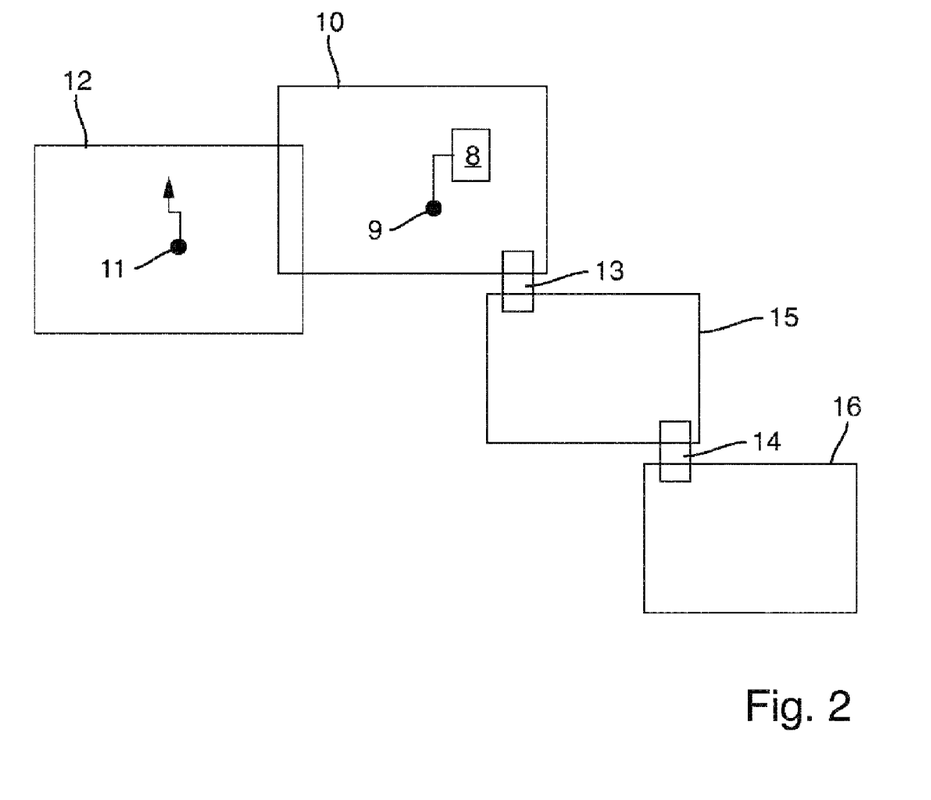
FIG. 2 shows a field detection device that determines connection possibilities in a fieldbus network comprising a plurality of fieldbus segments.

The field detection device can be designed to execute a query for field devices and fieldbus components which support a specific connection protocol only within the at least one fieldbus segment to which the field detection device is connected. Alternatively, however, the querying of connection possibilities executed by the field detection device can also extend over a plurality of fieldbus segments. An example of this type is shown in FIG. 2. The field detection device 8 is connected via a wired connection to a first access point 9 of a fieldbus segment 10 and is furthermore connected via a wireless connection to a second access point 11 of a second fieldbus segment 12. The field detection device 8 can therefore identify, both in the fieldbus segment 10 and in the fieldbus segment 12, those field devices and fieldbus components which support a specific connection protocol. Furthermore, the queries executed by the field detection device 8 can also be extended to those fieldbus segments which are connected to the fieldbus segments 10 and 12 via gateway devices 13, 14. In this respect, the queries made by the field detection device 8 regarding the field devices and fieldbus components which support specific connection protocols can also be extended via the gateway devices 13 and 14 to the adjacent fieldbus segments 15 and 16, so that also within these fieldbus segments 15 and 16 those field devices and fieldbus components can be identified which can be reached by means of a specific connection protocol. For example, it is possible for a recursive scan to be carried out by the field detection device 8 for a specific connection protocol which scans the device status one after the other in the fieldbus segment 16, in the fieldbus segment 15 and then in the fieldbus segment 10 via the gateway devices 13 and 14. The establishment of test connections to field devices and fieldbus components within the fieldbus segments 15 and 16 on a trial basis is also possible via the gateway devices 13 and 14. Due to these procedures, the field detection device 8 can also detect and provide an overview of the connection possibilities for the various field devices and fieldbus components for complex and intricate network topologies comprising a multiplicity of fieldbus segments.

An example of a connection directory 17 created by the field detection device 5 based on the results of the queries and device scans described above is shown in FIG. 3. All connection possibilities for three different field devices are listed in the connection directory 17, wherein each of the field devices is specified in more detail by its IP address, the tag and the device type. In addition, further device details can be listed here that are obtained from the devices in the course of the executed queries. The connection possibilities for the two flowmeters Tank_1 and Tank_7 and for the fill-level measurement device Tank_12 are specified in the connection directory 17 shown in FIG. 3. As can be seen from the table, the flowmeter Tank_1 can be accessed by means of the Profinet connection protocol. On the other hand, the flowmeter Tank_7 supports the connection protocols Profinet and OPC UA, so that a choice between two different Ethernet-based connection protocols is possible here. The fill-level measurement device Tank_12 supports only the HART IP connection protocol and moreover provides an internet server so that the internet site of the fill-level measurement device Tank_12 can be accessed by means of the HTTP connection protocol. A choice between two different connection protocols is therefore also possible in the case of the fill-level measurement device Tank_12. In addition to the information shown in the example of FIG. 3, the connection directory 17 can also include information regarding access paths and possible access points for the establishment of a data connection for the field device in question. In addition, it can be provided, for example, to keep drivers available for downloading via the field detection device 5 for various field devices and fieldbus components, for example drivers according to the FDI package standard.

Figure 3:
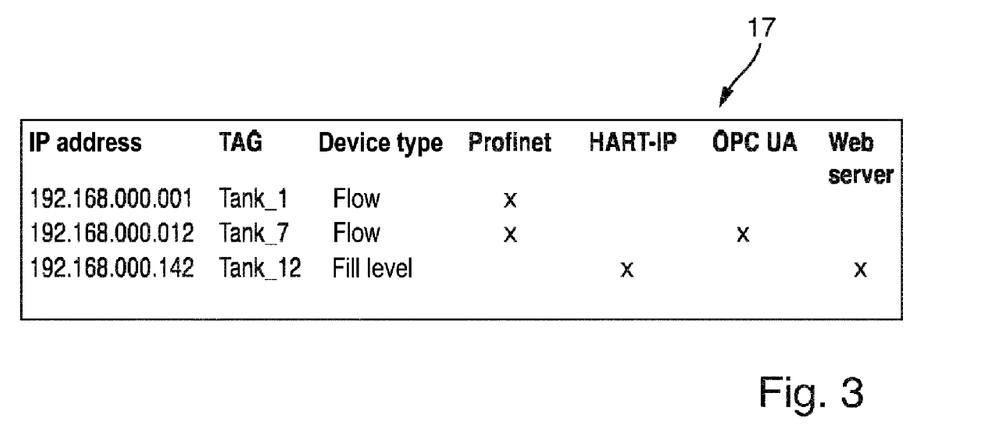
FIG. 3 shows a connection directory in which the associated connection possibilities are specified for the various field devices.
Figure 4:
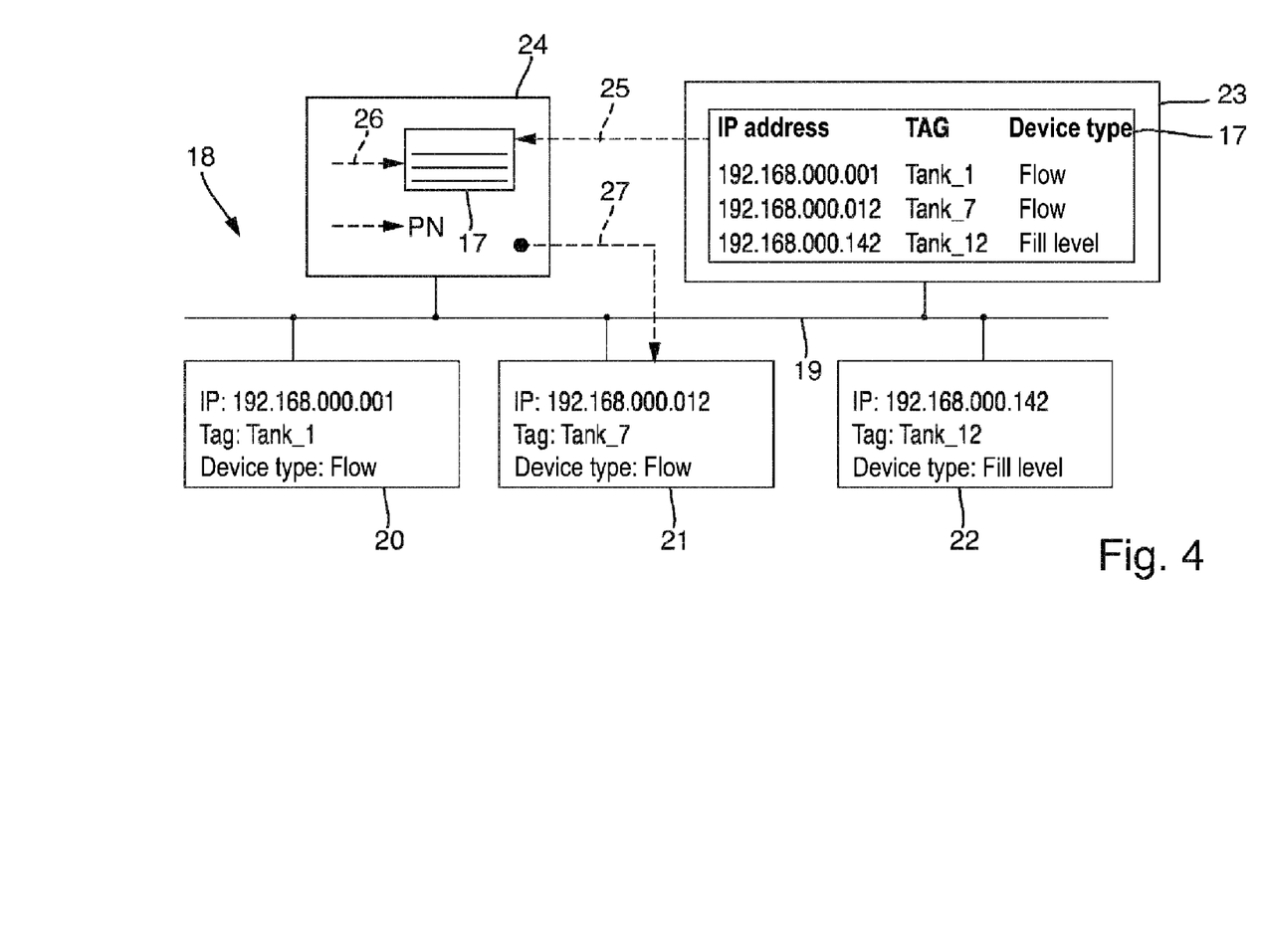
FIG. 4 shows a field operating device which retrieves the connection directory from the field detection device, selects a connection possibility to a field device and accesses the field device according to this connection possibility.

FIG. 4 shows the fieldbus system 18 for which the connection directory 17 shown in FIG. 3 has been detected. Connected to the field bus 19 therefore are a flowmeter 20 with the tag Tank_1, a flowmeter 21 with the tag Tank_7 and a fill-level measurement device 22 with the tag Tank_12. The field detection device 23 also connected to the field bus 19 is designed to query the connection possibilities for the field devices 20, 21 and 22 and to generate the connection directory 17 shown in FIG. 3 on the basis of the result of these queries. In this connection directory 17, the connection possibilities for access to the field device in question are listed for each of the field devices 20 to 22. It should now be assumed that a specific field device of the fieldbus network 17, for example the flowmeter 21, is to be accessed from a field operating device 24. The field operating device 24 can be, for example, a mobile device, for example a tablet, a laptop or a mobile telephone, on which field access software such as, for example, the Field Care program from Endress+Hauser is installed. The field operating device 24 is designed to connect to the field detection device 23 first and in step 25 to download the current version of the connection directory 17 for the field operating device 24. The connection directory 17 is thus available to the field operating device 24. It can be seen from the connection directory 17 that the flowmeter 21 can be accessed optionally via Profinet or via OPC UA. From these two connection possibilities, in step 26 the field operating device 24 selects the most suitable connection possibility, for example a connection by means of the Profinet protocol. In step 27 a Profinet connection is established between the field operating device 24 and the flowmeter 21. Suitable criteria can be defined in advance for the field operating device 24 to select the most suitable connection, such as transmission bandwidth, latency requirements, especially real-time requirements, availability of the connection protocol on the field operating device 24, and so on.

Figure 5:
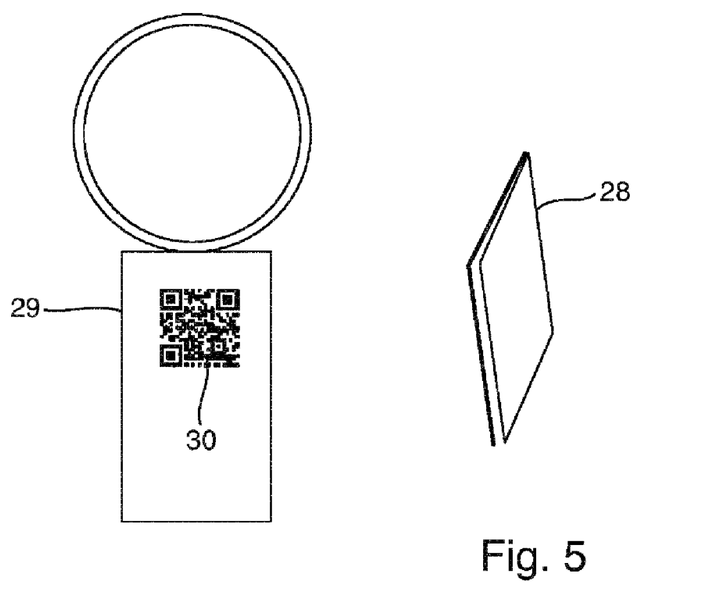
FIG. 5 shows a field device with a QR code applied thereto in which connection possibilities for the field device are coded.

The field detection device 23 can additionally be designed to generate a QR code or another optically readable code from the connection possibilities existing for a specific field device or a specific fieldbus component. In this case, the generated QR code can contain information regarding a specific connection possibility, but it can also include information about a plurality of possible connections. The QR code thus generated or another optically readable code which contains the connection possibilities for a specific field device or a specific fieldbus component in coded form can then be printed out and stuck onto the field device in question or the field component, for example in the form of a label. If a user then wants to access the field device 29 via his mobile device 28, for example via a mobile telephone, all that is necessary is to read the QR code 30 or the other optically readable code with the camera of the mobile device 28 and for the mobile device 28 to evaluate the QR code 30 or the other code. If the information contained in the QR code 30 specifies a plurality of alternative access possibilities, the mobile device 28 can select from among the various access possibilities and then access the field device 29 via the fieldbus network according to this connection possibility. In this way, a user in the field can access parameters of the various field devices and fieldbus components quickly and straightforwardly via his mobile device and modify them as necessary.

The invention claimed is:

1. A field detection device, comprising:
    at least one fieldbus interface;
    a central processing unit; and
    a memory associated with the central processing unit;
    wherein the field detection device is designed to be connected to at least one access point of a fieldbus network via the at least one fieldbus interface,
    wherein the field detection device is further designed to initiate or execute, for each of at least two connection protocols, an associated query in at least one fieldbus segment of the fieldbus network and to detect which field devices and fieldbus components in said at least one fieldbus segment can be accessed by means of the connection protocol in question,
    wherein the field detection device is further designed to provide a connection directory in which at least one connection protocol is specified for each field device and for each fieldbus component of a set of field devices and fieldbus components of the at least one fieldbus segment by means of which connection protocol the field device in question or the fieldbus component in question can be accessed, and
    wherein in the connection directory at least one access path is specified in each case for a field device or a fieldbus component and a connection protocol supported by this field device or fieldbus component via which a field operating device can access the field device or the fieldbus component.

2. The field detection device according to claim 1, characterized by at least one of the following:
    at least one connection protocol is specified in the connection directory for each field device and for each fieldbus component of the at least one fieldbus segment by means of which protocol the field device in question or the fieldbus component in question can be accessed; and
    in the connection directory, all connection protocols which have been checked by the field detection device and by means of which the field device in question or the fieldbus component in question can be accessed are specified for each field device and for each fieldbus component of the set of field devices and fieldbus components of the at least one fieldbus segment.

3. The field detection device according to claim 1, characterized by at least one of the following:
    the field detection device is designed to transmit the connection directory in full or in part to a field operating device upon a request of the field operating device;
    the field detection device is designed to exchange data with the fieldbus network via the at least one access point;
    the connection protocols are Ethernet-based connection protocols;
    the connection protocols comprise at least one fieldbus protocol;
    the connection protocols comprise at least one Industrial Ethernet protocol; and
    the connection protocols comprise at least one of: Profinet, HTTP, TCP UA, OPC UA, CDI_TCP, EtherNet/IP, HART-IP.

4. The field detection device according to claim 3, wherein the field detection device is designed to establish test connections on a trial basis under a specific connection protocol for the field devices and fieldbus components of the at least one fieldbus segment and thus to determine whether a field device in question or a fieldbus component in question supports the connection protocol in question.

5. The field detection device according to claim 1, characterized by at least one of the following:
    the field detection device is designed to establish connections with the fieldbus network via at least two access points;
    the field detection device is designed to establish at least one wireless connection with at least one first access point of the fieldbus network; and
    the field detection device is designed to establish at least one wired connection to at least one second access point of the fieldbus network.

6. The field detection device according to claim 1, characterized by at least one of the following:
    connection possibilities for field devices and fieldbus components of the fieldbus network are arranged in the connection directory grouped by field devices or fieldbus components;
    the connection possibilities for field devices and fieldbus components of the fieldbus network are grouped in the connection directory according to one of the following: IP addresses of the field devices or fieldbus components, MAC addresses of the field devices or fieldbus components, tags of the field devices or fieldbus components;
    in the connection directory, at least one of the following is specified for a field device or a fieldbus component: an IP address, a MAC address, a tag; and
    topology information is maintained by the field detection device, and the field detection device is designed to determine a suitable access path to a field device or a fieldbus component and to a particular connection protocol based on the topology information.

7. The field detection device according to claim 1, characterized in that in the connection directory in each case at least one access point is specified for a field device or a fieldbus component and a connection protocol supported by this field device or the fieldbus component by means of which access point a connection to the field device or the fieldbus component can be established.

8. The field detection device according to claim 1, characterized by at least one of the following:
    the field detection device is designed to update the connection directory in accordance with a prespecifiable time scheme;
    the field detection device is designed to repeat, for the at least two connection protocols, the query as to which field devices and fieldbus components of the at least one fieldbus segment can be accessed by means of the connection protocol in question in accordance with a prespecifiable time scheme and to update the connection directory using the found results;
    the field detection device is only designed to provide the connection directory to a field operating device and is not designed to establish connections to field devices and fieldbus components of the fieldbus network;

the field detection device is not designed to establish connections between a field operating device and a field device or a fieldbus component of the fieldbus network; and the field detection device is configured as a standalone separate device which is designed to be connected to a fieldbus network.

9. The field detection device according to claim 1, characterized by any of the following:

the field detection device is designed to execute the query as to which field devices and fieldbus components can be accessed by means of a respective connection protocol only within the at least one fieldbus segment; and the field detection device is designed such that the query as to which field devices and fieldbus components can be accessed by means of a connection protocol in question extends beyond the at least one fieldbus segment via gateway devices to additional fieldbus segments of the fieldbus network.

10. The field detection device according to claim 1, characterized by at least one of the following:

the field detection device is designed to provide an internet server via which field devices and fieldbus components of the fieldbus network can be accessed by means of the HTTP protocol;

the field detection device is designed to provide an internet server with links to internet sites and internet services of field devices and fieldbus components of the fieldbus network; and the field detection device is designed to provide the OPC UA standard with an OPC UA information model which contains connection information to field devices and/or fieldbus components.

11. The field detection device according to claim 1, wherein the field detection device is designed to generate a quick response (QR) code for application to a specific field device or a specific fieldbus component of the fieldbus network, wherein at least one connection protocol is specified in the QR code by means of which the field device or the fieldbus component can be accessed.

12. The field detection device according to claim 11, characterized by at least one of the following:

at least one access path via which a field operating device can access the field device or the fieldbus component and a connection protocol supported by this field device or the fieldbus component is specified in the QR code for the field device or the fieldbus component; and at least one access point is specified in the QR code for the field device or the fieldbus component and a connection protocol supported by this field device or the fieldbus component by means of which protocol a connection to the field device or the fieldbus component can be established.

13. A field detection device, comprising:

at least one fieldbus interface;

a central processing unit; and a memory associated with the central processing unit;

wherein the field detection device is designed to be connected to at least one access point of a fieldbus network via the at least one fieldbus interface, wherein the field detection device is further designed to initiate or execute, for each of at least two connection protocols, an associated query in at least one fieldbus segment of the fieldbus network and to detect which field devices and fieldbus components in said at least one fieldbus segment can be accessed by means of the connection protocol in question, wherein the field detection device is further designed to provide a connection directory in which at least one connection protocol is specified for each field device and for each fieldbus component of a set of field devices and fieldbus components of the at least one fieldbus segment by means of which connection protocol the field device in question or the fieldbus component in question can be accessed, and wherein the field detection device is further designed to transmit a scan command relating to a specific connection protocol to the fieldbus network and to determine by means of a scan of the at least one fieldbus segment which field devices and fieldbus components of the at least one fieldbus segment can be accessed by means of the connection protocol in question.

* * * * *